Figure 1:
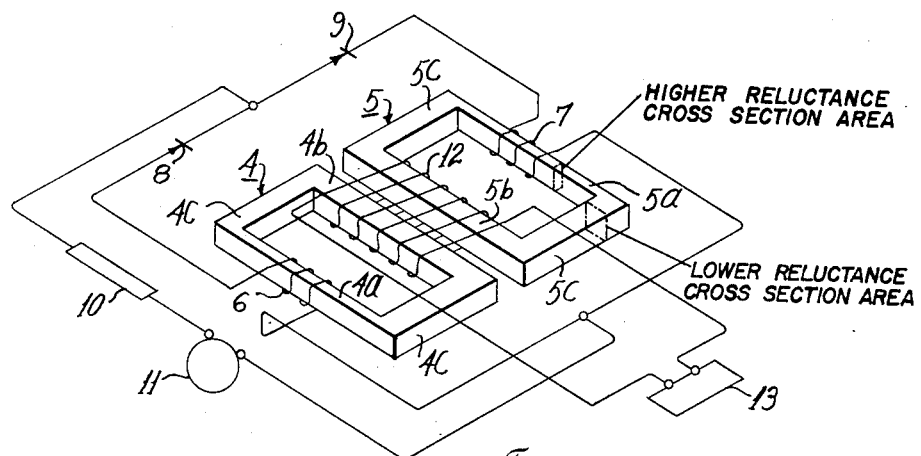

April 12, 1960 U. H. KRABBE ET AL 2,932,787
MAGNETIC AMPLIFIER
Filed March 19, 1956

Inventors
Ulrik H. Krabbe
Harald M. Sorensen
by Joseph E. Kerwin
Attorney

United States Patent Office 2,932,787
Patented Apr. 12, 1960

2,932,787
MAGNETIC AMPLIFIER

Ulrik H. Krabbe, Helsingor, and Harald M. Sorensen, Fruens Bogi, Denmark, assignors to Allis-Chalmers Manufacturing Company, Milwaukee, Wis., a corporation of Delaware Application March 19, 1956, Serial No. 572,361

8 Claims. (Cl. 323—89)

This invention relates in general to saturable reactors and in particular to improvements in saturable reactors of the self-saturated type known as magnetic amplifiers.

Magnetic amplifiers are well known wherein a three legged core has wound thereon a pair of reactance windings and a control winding. The core is either a unitary one of the three legged shell type or one comprising a pair of identical window core elements placed adjacent each other to form an aggregate type three legged core. In either case, the outside legs and the yokes of the three legged core have the same cross section of magnetic material whereas the center leg has twice this cross section of magnetic material. The core is made of the same magnetic material throughout. A control winding is wound on the core, usually on the center leg, and is energized by a reversible variable direct current. One reactance winding is wound on one of the outside legs and another reactance winding is wound on the other outside leg. A rectifier is connected in series with each of the reactance windings and the two branches thus formed are connected in parallel and energized by alternating current. The rectifiers are connected so that each of the reactance windings operates on the opposite half cycle of the alternating current.

One of the disadvantages of these prior art magnetic amplifiers is that they are unstable in their operation in that a phenomenon known as "triggering" quite often occurs. This is especially prevalent in high performance magnetic amplifiers wherein the leakage of the rectifiers is very low and also in magnetic amplifiers wherein the impedance of the control winding is low.

This triggering phenomenon of instability may be minimized by using rectifiers that do not have such low leakage or by connecting a resistor across the rectifiers. However, this has the disadvantage of decreasing the gain of the amplifier.

Another way of minimizing the triggering effect is to place a capacitor across the two rectifiers. However, this has the disadvantage that the size of the capacitor cannot be predetermined, but must be selected by trial and error. Another disadvantage of this is that a device so made cannot readily be used in aircraft at high altitudes where low temperatures exist. This is because electrolytic capacitors are not reliable at low temperatures and oil filled capacitors are too heavy and occupy too much volume for use in aircraft.

The invention overcomes all the above disadvantages by providing a magnetic amplifier of the above discussed well known type, but having a core wherein the legs carrying the reactance windings have a greater reluctance per unit length than any of the other portions of the core. The triggering phenomenon of instability is thus eliminated and the amplifier has a stable operating characteristic without utilizing any capacitors, resistors, or special rectifiers to minimize triggering. The gain of the amplifier, its weight, its volume and its reliability at low temperatures are thus not adversely affected. The magnetic amplifier thus obtained is stable when used with control windings of either high impedance or low impedance.

It is therefore an object of this invention to provide a magnetic amplifier free from any triggering phenomenon of instability.

Another object of my invention is to provide such a stable magnetic amplifier which is reliable at low temperatures, relatively light in weight and small in volume.

It is a further object of this invention to provide a stable magnetic amplifier, the stability of which is independent of the impedance of the control winding.

Figure 2:
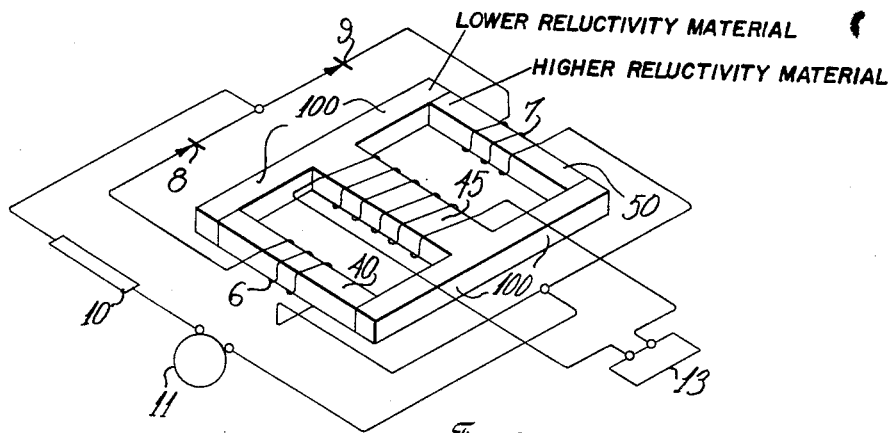
Figure 3:
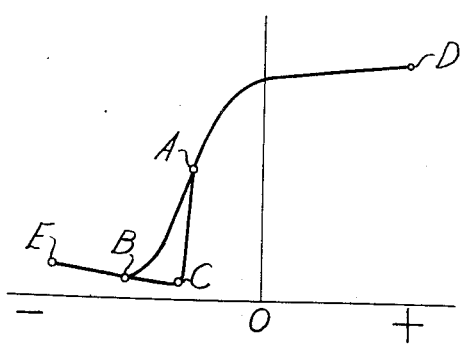

Other objects and advantages will appear from the following detailed description when read in connection with the accompanying drawing, in which:

Fig. 1 illustrates one embodiment of the invention;
Fig. 2 illustrates another embodiment of the invention; and
Fig. 3 is a graph illustrating the operation of the invention and its advantage over the prior art.

Referring to Fig. 1, a magnetic amplifier is shown having a three legged core of the aggregate type comprising a pair of identical window core elements 4, 5. Window core element 4 has an outside leg portion 4a and an inside leg portion 4b connected by yoke portions 4c. Window core element 5 has an outside leg portion 5a and an inside leg 5b connected by yoke portions 5c. Inside legs 4b and 5b together form the center leg portion of the aggregate core.

A first reactance winding 6 is wound on leg 4a and connected in series with this reactance winding is a rectifier 8. A second reactance winding 7 is wound on leg 5a and connected in series with this reactance winding is a rectifier 9. These rectifiers and reactance windings are connected to a source of alternating current such as alternator 11 through a load device 10. Rectifiers 8 and 9 are connected with their polarities such that the branch comprising rectifier 8 and reactance winding 6 operates on one-half cycle of the alternating current and the branch comprising rectifier 9 and reactance winding 7 operates on the opposite half cycle.

A control winding 12 is wound on the core. Winding 12 is shown wound on the center leg portion comprising inner legs 4b and 5b. The control winding is connected to a source 13 of reversible variable unidirectional current. The load current through load device 10 may be varied in a well known manner by varying the unidirectional current supplied to control winding 12 as is illustrated in Fig. 3.

Fig. 3 is a graph wherein the abscissa represents the unidirectional control current supplied to control winding 12 from source 13 and wherein the ordinate represents the load current in load device 10. It can be seen from the curve presented in the graph of Fig. 3, that the current in load device 10 may be abruptly and substantially changed by varying the control current over the range of values between the values indicated at points D and E.

In the magnetic amplifiers of the prior art, wherein all portions of the core are made of the same magnetic material, the outside legs corresponding to legs 4a and 5a are of the same cross section as the yokes of the core and are one half the cross section of the center leg of the core. Such magnetic amplifiers are unstable in their operation in that the phenomenon known as triggering occurs.

This triggering phenomenon of instability is illustrated in Fig. 3. The action is as follows: when the control current increases in the negative direction the amplifier is brought to the cut off point B and the load current varies along the line ABE. Then, when the control current decreases to a less negative value the amplifier remains cut off beyond the point B and suddenly, upon reaching a point such as point C, the current abruptly rises to perhaps one-fourth or one-half full load to a point such as point A and the load current thus varies along the lines BCA.

In other words, when the control current is varied in one direction, e.g., from point D to point E, the variation of the load current is along the line DABE, but when the control current is varied in the opposite direction, e.g., from point E to point D, the variation is along the line EBCAD.

The invention completely overcomes this triggering phenomenon of instability and causes the load current to vary along the same line for all control current variations; i.e., the load current varies along the line DABE when the control current is varied in one direction, and back along the same line EBAD when the control current is varied in the opposite direction.

This new and advantageous result of eliminating triggering is brought about by causing the reluctance per unit length of the legs embraced by the reactance windings to be greater than the reluctance per unit length of any of the other portions of the core.

Referring to Fig. 1, this is done by having the cross section of legs 4a, 5a smaller than the cross section of the yokes 4c, 5c and the inside legs 4b, 5b. The outside legs 4a, 5a thus have a cross section which is smaller than the cross section of yokes 4c, 5c and is less than one half the cross section of the center leg portion.

In the operation of magnetic amplifiers, on one-half cycle of the alternating current, core element 4 is highly saturated and core element 5 is unsaturated. In the magnetic amplifiers of the prior art, the cores were of uniform cross section and of the same material throughout, and the magnetomotive force drop was therefore uniformly distributed around core element 4 and thus a considerable magnetomotive force drop existed in the inside leg 4b. A considerable amount of leakage flux therefore influenced core element 5 and the induced voltage in the control winding 12 caused by the flux in core element 4 did not at every instant cancel out the induced voltage in the control winding 12 caused by the flux in core element 5. This is believed to be a cause of the triggering phenomenon of instability, especially with a control winding of low impedance.

The invention eliminates triggering by causing the reluctance per unit length of the legs 4a, 5a, which carry the reactance windings, to be greater than the reluctance per unit length of the rest of the core.

For example, as shown in Fig. 1, the core is of the same magnetic material throughout but legs 4a, 5a have a slightly smaller cross section of magnetic material than that of any of the other portions of the core. Thus, on the half cycle under discussion, by utilizing the invention, it has been found that practically all the magnetomotive force drop is in the leg 4a and only a small fraction of this drop is in the rest of core element 4. It has been discovered that the invention thus causes the magnetic amplifier to operate with a stable characteristic, completely eliminating the triggering phenomenon, with either a high or a low impedance control winding and thus makes the stable operation of the amplifier independent of the impedance of the control winding. Since only the legs carrying the reactance winding become saturated, the control winding ampere-turns requirement and the no load alternating current are lower than they otherwise would be.

The same result is accomplished by the embodiment of the invention illustrated in Fig. 2. In Fig. 2 there is shown a magnetic amplifier having a core of the three legged shell type. Outside leg portions 40, 50 and center leg portion 45 are joined by yoke portions 100. The other elements of the amplifier are identical to those shown in Fig. 1 and are referred to by identical reference numerals. The legs 40, 50 have the same cross section of magnetic material as that of yokes 100 and have one half the cross section of magnetic material as that of center leg 45.

Outside legs 40, 50 in Fig. 2 are of a magnetic material having a greater value of reluctivity than the magnetic material of the rest of the core. In this way the reluctance per unit length of outside legs 40, 50 is greater than the reluctance per unit length of any of the other portions of the core; being greater than that of yokes 100 and greater than twice that of center leg portion 45. Most of the magnetomotive force drop is in legs 40, 50 and only the legs 40, 50 become saturated. The triggering phenomenon is eliminated and a stable operating amplifier is obtained which is independent of the impedance of the control winding.

It is thus seen that the triggering phenomenon of instability, commonly occurring in self-saturated magnetic amplifiers, is eliminated by this invention by providing a magnetic amplifier with a core wherein the reactance winding legs of the core have a greater value of reluctance per unit length than that of any of the other portions of the core.

One embodiment of this invention, as is illustrated in Fig. 1, is to provide a core wherein the reactance winding legs have a smaller cross section of magnetic material than that of any of the other portions of the core.

Another embodiment, as is illustrated in Fig. 2, is to provide a core wherein the reactance winding legs are constructed of a magnetic material having a greater value of reluctivity than that of the material of any of the other portions of the core.

A third embodiment, of course, is a combination of the above two embodiments.

It will be apparent to those skilled in the art that various changes and modifications may be made in the embodiments of the invention illustrated and described herein without departing from the spirit of the invention or from the scope of the appended claims.

It is claimed and desired to secure by Letters Patent:

1. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings; a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said core; a source of variable unidirectional current for energizing said control winding; said first and second leg portions having a greater value of reluctance per unit length than that of any of the other said portions of said core.

2. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings, a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said core; a source of variable unidirectional current for energizing said control winding; said first and second leg portions having a smaller cross section of magnetic material than that of any of the other said portions of said core.

3. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings, a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said core; a source of variable unidirectional current for energizing said control winding; said first and second leg portions being of material having a greater value of reluctivity than that of the material of any of the other said portions of said core.

4. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings, a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said third leg portion; a source of variable unidirectional current for energizing said control winding; said first and second leg portions being of the same magnetic material as that of the other said portions of said core and having a smaller cross section of magnetic material than that of any of the other said portions.

5. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings, a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said third leg portion; a source of variable unidirectional current for energizing said control windings; said first and second leg portions having the same cross section of magnetic material as the other said portions of said core and being of material having a greater value of reluctivity than that of the material of any of the other said portions.

6. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings, a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said third leg portion; a source of variable unidirectional current for energizing said control windings; said first and second leg portions having a value of reluctance per unit length greater than that of said yoke portions and greater than twice that of said third leg portion.

7. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings, a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said third leg portion; a source of variable unidirectional current for energizing said control windings; said first and second leg portions being of the same magnetic material as that of the other said portions of said core and having a cross section of magnetic material smaller than that of said yoke portions and less than one half that of said third leg portion.

8. A magnetic amplifier comprising: a core having a first, a second and a third leg portion; yoke portions connecting said leg portions; a first reactance winding wound on said first leg portion; a second reactance winding wound on said second leg portion; a source of alternating current for energizing said reactance windings, a first rectifier connected in series with said first reactance winding for conducting current therethrough only on the positive half cycle of said alternating current; a second rectifier connected in series with said second reactance winding for conducting current therethrough only on the negative half cycle of said alternating current; a control winding wound on said third leg portion; a source of variable unidirectional current for energizing said control windings; said first and second leg portions having the same cross section of magnetic material as that of the yoke portions and having one half the cross section of magnetic material as that of said third leg portion, said first and second leg portions being of material having a greater value of reluctivity than that of the material of said yoke portions and third leg portion.

References Cited in the file of this patent
UNITED STATES PATENTS

| | | |
|---|---|---|
| 1,599,570 | Lucas | Sept. 14, 1926 |
| 2,027,311 | Fitzgerald | Jan. 7, 1936 |
| 2,552,203 | Morgan | May 8, 1951 |
| 2,615,155 | Ogle | Oct. 21, 1952 |
| 2,623,205 | McCreary | Dec. 23, 1952 |
| 2,818,545 | Lamm | Dec. 31, 1957 |

FOREIGN PATENTS

| | | |
|---|---|---|
| 1,063,532 | France | Dec. 16, 1953 |